United States Patent [19]

Sullivan

[11] 4,404,725

[45] Sep. 20, 1983

[54] TOOL FOR INSTALLING AN ELEMENT ON A SHAFT

[75] Inventor: William C. Sullivan, North East Newark, Ohio

[73] Assignee: Rockwell International Corporation, Pittsburgh, Pa.

[21] Appl. No.: 407,013

[22] Filed: Aug. 11, 1982

Related U.S. Application Data

[63] Continuation of Ser. No. 179,412, Aug. 18, 1980, abandoned.

[51] Int. Cl.[3] .............................................. B23P 19/04

[52] U.S. Cl. ...................................................... 29/252

[58] Field of Search ................................ 29/261–265, 29/252, 253; 254/18, 29 A

[56] References Cited

U.S. PATENT DOCUMENTS

| | | | |
|---|---|---|---|
| 2,797,889 | 7/1957 | Talboys | 29/252 |
| 3,166,834 | 1/1965 | Newman | 29/263 |
| 3,529,497 | 9/1970 | Brooks | 254/18 |

FOREIGN PATENT DOCUMENTS

| | | | |
|---|---|---|---|
| 561233 | 8/1958 | Canada | 254/18 |
| 2535482 | 2/1976 | Fed. Rep. of Germany | 254/18 |
| 1543119 | 3/1979 | United Kingdom | 254/18 |

*Primary Examiner*—Robert C. Watson

[57] ABSTRACT

A tool is for installing a yoke on a shaft which has a threaded end and an enlarged splined portion adjacent the threaded end. The yoke has a splined opening therethrough which is dimensioned to pass over the threaded end to be received with an interference fit on the splined portion of the shaft. The tool has a tubular ram supported on a power cylinder with its piston rod extending into the interior of the tubular ram. A gripping member is mounted on the piston rod and is capable of gripping the threaded end of the shaft so that the end of the tubular ram forces the yoke on the splined portion of the shaft as the gripping member pulls the shaft toward the power cylinder.

3 Claims, 4 Drawing Figures

TOOL FOR INSTALLING AN ELEMENT ON A SHAFT

This application is a continuation of application Ser. No. 179,412, filed Aug. 18, 1980 now abandoned.

BACKGROUND OF THE INVENTION

1. Field of the Invention

This invention relates to a tool for installing an element on a shaft in which there is a design interference fit between the element and the shaft which must be overcome during installation.

2. Description of the Prior Art

There are a number of configurations in the design of machines and equipment in which an element is to be installed on a shaft with a designed interference fit between them to insure that the element is rigidly retained on the shaft once installed thereon.

For example, in the automotive industry, there are a number of instances in which yokes are to be installed in this manner on shafts of drive trains, transmissions, transfer cases etc. Although such yokes may be ultimately retained on the shaft by a nut installed on a threaded end of the shaft, to insure a proper joining of the yoke to the shaft, an interference fit therebetween is often designed into the installation.

However, there has remained a problem of providing a means for the proper application of force between the yoke and the shaft during installation to quickly and safely overcome the interference fit designed therebetween. Clearly, simply driving the yoke on the shaft with a sledge or other power driving tool is not satisfactory since the interference fit may be marred or galled making proper installation impossible. Additionally, while there has been some tool configurations utilized which employ a power cylinder for forcing the yoke on the shaft, these usually require an element to be threaded onto the threaded end of the shaft and then joined to the piston rod of the power cylinder. These configurations take a significant amount of time and a number of steps for assembling and disassembling the tool even though the ultimate force applied by the power cylinder does result in a satisfactory installation.

SUMMARY OF THE INVENTION

It is, therefore, an object of this invention to provide a tool for installing an element on a shaft which is simple and reliable and can be operated in a short time in an assembly line.

These and other objects of the invention are provided in a preferred embodiment thereof in the form of a tool for installing an element on a shaft which has a threaded end and an enlarged portion adjacent the threaded end. The element has an opening therethrough which is dimensioned to pass over the threaded end to be positioned on the enlarged portion of the shaft with an interference fit therebetween when the element is fully installed on the shaft. The tool includes a power cylinder having a piston means movably mounted therein. A tubular ram is supported by the power cylinder and extends therefrom and has an end which is capable of making contact with the surface of the element around the opening. A gripping member projects from the piston means of the power cylinder to extend through an interior of the tubular ram. The piston means is capable of moving an extended end of the gripping member into and outwardly of the interior of the tubular ram.

The extended end of the gripping member is circumferentially divided into sections by axially extending slots therethrough. The sections of the extended end have an internally threaded portion to match the threaded end of the shaft. The sections are preformed to be separated one from the other to allow the internally threaded portion to freely pass over the threaded end of the shaft when the extended end is outwardly of the interior of the tubular ram. The tubular ram has an interior wall which makes sliding contact with an exterior surface of the extended end of the gripping member to cam the sections thereof inwardly to entrap the threaded end of the shaft in the interior threaded portions when the extended end is moved into the interior of the tubular ram. The end of the tubular ram is then capable of acting on the surface of the element to overcome the interference fit and force the element on the enlarged portion as the extended moves further into the interior of the tubular ram.

DETAILED DESCRIPTION OF THE PREFERRED EMBODIMENT

Figure 1:
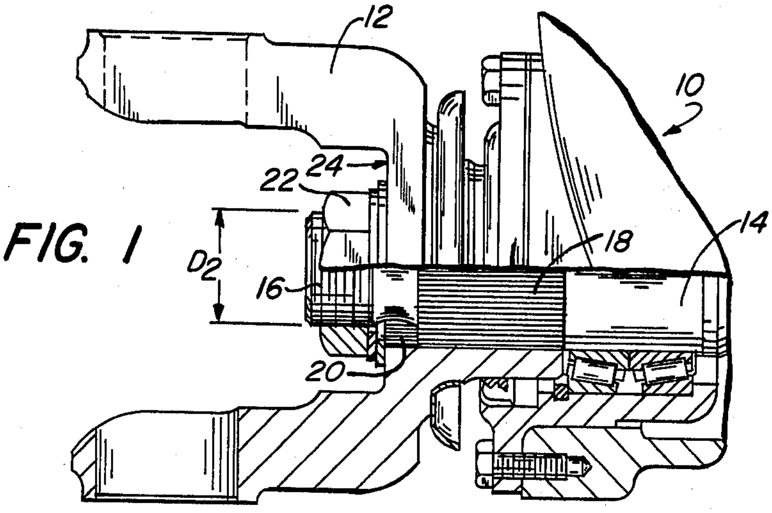
FIG. 1 is an elevational view partially in section of a typical assembly for which the preferred tool was designed.

As seen in FIG. 1, a typical automotive carrier assembly 10 includes elements which can be readily assembled with the tool of the present invention. A yoke 12 in the assembly 10 is to be installed on a shaft 14 for the transmission of torsional forces therebetween. The shaft 14 includes an extended end 16 which is threaded and an adjacent, enlarged portion 18 on which the yoke 12 is to be installed. The enlarged portion 18 includes a plurality of generally axially extending splines thereon. An interference fit is created by the internal splines of an opening 20 through the yoke 12. For final assembly, a washer and nut configuration 22 are installed on the threaded end 16 of the shaft 14 to insure that the yoke 12 will be retained thereon throughout operation of the assembly.

To provide a better understanding of the type of interference fit which is designed in such an assembly between the yoke 12 and the shaft 14, it is desirable to provide some dimensions and characteristics which are typical of such assemblies. In one such assembly 10, the enlarged portion 18 and the hole 20 in the yoke 12 include a diameter of about 2 inches. The number of splines on each member is 39 with the splines on the enlarged portion 18 being rolled to include a helix angle and the internal splines of the opening 20 being broached. The helix angle of the splines on the enlarged portion 18 are in this assembly 10 designed to be at a right hand turn at 19 minutes.

Although the misalignment of the splines produces the desired interference fit during final installation, the yoke 12 can be partially installed upon the enlarged portion 18 by hand as it freely passes over the extended end 16. After hand installation of the yoke 12 on the enlarged portion 18, the threads of the extended end 16 are partially exposed beyond the surface 24 of the yoke 12 which surround the opening 20. As will be seen, partial installation in this manner provides a means for the tool of the present invention to be employed for the full, complete installation of the yoke 12 on the enlarged portion 18 in opposition to the interference fit designed therebetween.

Figure 2:
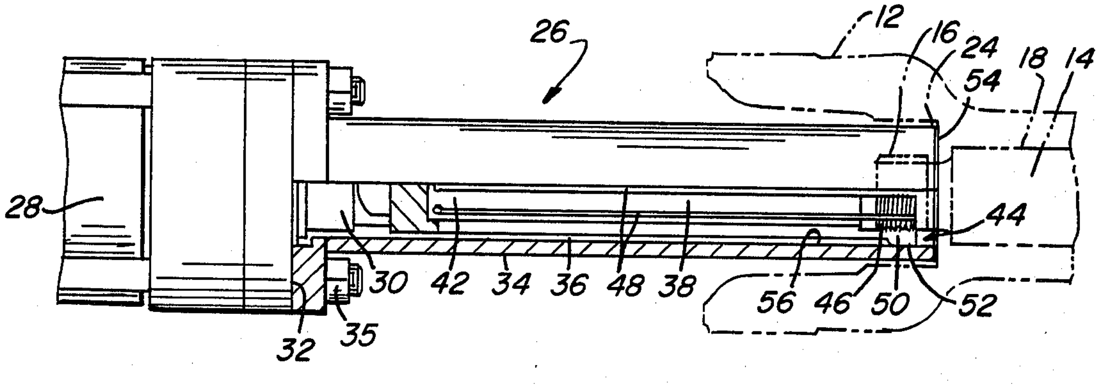
FIG. 2 is an elevational view partially in section of the preferred tool of the invention.

As seen in FIG. 2, the preferred tool 26 includes a power cylinder 28 which has a hydraulic piston (not shown) movably mounted therein. The piston is secured to a piston rod 30 which extends from the end 32 of the power cylinder 28. A tubular ram 34 is secured by bolt means 35 to the end of 32 of the power cylinder 28 with the interior 36 thereof aligned with the piston rod 30 in such a manner that the piston rod 30 can freely extend into the interior 36.

Figure 3:
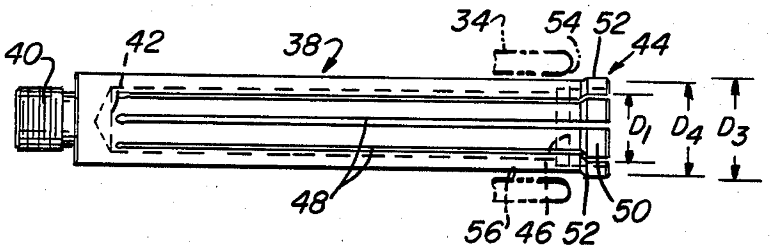
FIG. 3 is an elevational view of the preferred gripping member of the tool shown in FIG. 2.
Figure 4:
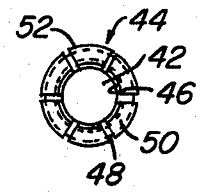
FIG. 4 is an end view of the gripping member shown in FIG. 3.

As seen in FIGS. 3 and 4, a gripping member 38 includes a threaded end 40 which is adapted to be secured to the piston rod 30. When so assembled, the gripping member 38 is located within the interior 36 of the tubular ram 34. In its initial formation, the gripping member 38 is generally cylindrical and includes a hollow interior 42. An extended 44 of the gripping member 32 is internally threaded at 46 with the internal threads thereof being designed to match and mate with the threads of the end 16 of the shaft 14. However, the gripping member 38 is then provided a plurality of slots 48 which extend axially from the extended end 44 to terminate at an intermediate area of the gripping member 38 prior to reaching the threaded end 40. As a result, the extended 44 is divided into a plurality of sections 50 which each include a portion of the interior threaded region 46 of the extended end thereon.

Prior to final hardening of the gripping member 38, the sections 50 are slightly spread apart to provide an internal diameter D1 for the threaded portion 46 which is larger than the external diameter D2 of the threaded end 16 of shaft 14. As might be expected from the view of the threaded end 16 shown in FIG. 1, the amount of spreading provided to the sections 50 of the gripping member 38 need not be very large and, in fact, is so small that it cannot be readily seen from the view in FIG. 3. However, it should be clear to one skilled in the art that such a minor spreading can be created prior to final hardening to effectively provide a threaded portion 46 of the extended end 44 which will freely receive the threaded end 16 of the shaft 14 therein if the sections 50 of the gripping 38 are allowed to remain in their natural state of being slightly separated one from the other as shown in FIGS. 3 and 4.

During the operation of the preferred tool 26, this natural state for the gripping member 38 will only occur when the extended end 44 is positioned outwardly of the interior 36 of the tubular ram 34. With the yoke 12 partially installed in the manner mentioned hereinabove, the power cylinder 28 is actuated so that the piston rod 30 will move the gripping member 38 in a direction which is outwardly of the ram 34. When the extended end 44 is outwardly of the ram 34 (as shown in phantom in FIG. 3) the gripping member 38 will be in the above-mentioned natural state with the sections 50 slightly separated. In this condition, the extended end 44 can be easily positioned over the threaded end 16 of the shaft 14. Activation of the power cylinder to cause the piston rod 30 to retract the gripping member 38 will initiate the operation of the tool 26 for the proper installation of the yoke 12 on the enlarged position 18.

Specifically, as the extended end 44 is retracted to be brought within the interior 36 of the tubular ram 44 a radially extended portion 52 on each section 50 of the extended end 44 will make contact with an end 54 of the ram 34. The external diameter D3 of the portions 52 is greater than the internal diameter D4 of the interior 36 of the ram 34. As a result, as the gripping member 38 and its entended end 44 are further drawn within the interior 36, an interior surface 56 of the tubular ram 34 will cam the portions 52 inwardly against their natural unbiased position as provided by the preforming of the gripping member 38 mentioned hereinabove. As the portions 52 are fully received within the interior 36 of the tubular ram 34, the internal diameter of the threaded portion 46 of each section 50 of the extended end 44 is reduced to tightly grip the threaded end 16 of the shaft 14. If, during this retraction of the gripping member 38, the threads of the threaded portion 46 and the end 16 are not properly aligned, the external diameter of the portions 52 will not be allowed to reduce sufficiently to actually be received within the interior 36 of the tubular ram 38. Therefore, while insuring that a proper gripping of the threaded end 16 is obtained, the dimensions mentioned hereinabove for the preferred tool 26 also insure that no actual operation of the tool 26 is made possible unless the threaded portions 46 are properly received around the threaded end 16 of the shaft 14.

Once the gripping member 38 and its extended end 44 are fully received within the interior 36 of the tubular ram 34, continued operation of the power cylinder will cause the end 54 of the tubular ram 34 to be brought into contact with the surface 24 of the yoke 12 which surrounds the opening 20. The force created by the power cylinder 28 in this manner is sufficient to overcome the designed interference fit between the opening 20 and the enlarged portion 18 of the shaft 14 so that the end 54 of the tubular ram 34 will fully install the yoke 12 on the shaft 14 as the extended end 44 of the gripping member 38 is further pulled within the interior 36 of the tubular ram 34 as shown in the fully installed position of FIG. 2.

As thus described the preferred tool 26 can be simply and readily utilized to install a yoke on a shaft by a simple operation of a power cylinder which is actuated to cause the gripping member thereof to be extended from the tubular ram for the receipt of the threaded end of the shaft therein. Further actuation of the power cylinder will cause the gripping member to firmly grip the threaded end and continued actuation of the power cylinder will cause the tubular ram to force the yoke on the shaft as the shaft is retained by the gripping member.

Although a preferred embodiment of the invention is described hereinabove, it should be clear that a number of elements might be changed without departing from the invention as claimed. Specifically, there might be a number of means employed for actually camming the extended end of the gripping member inwardly to retain the threaded end of the shaft without utilizing the specific portions 52 of the preferred embodiment. Additionally, the gripping member might be sectioned in some manner different from that employed in the preferred embodiment without departing from the invention as claimed.

We claim:

1. A tool for installing an element on a shaft said shaft having a threaded end with a plurality of external threads thereon and an enlarged portion adjacent to said theaded end, said element having an opening therethrough which is dimensioned to pass over said threaded end to be positioned on said enlarged portion of said shaft with an interference fit therebetween when said element is fully installed on said shaft, said tool comprising:

a power cylinder having a piston means movably mounted therein:

a tubular ram supported by said power cylinder and extending therefrom, said tubular ram having an end capable of making contact with a surface of said element around said opening;

a gripping member projecting from said piston means of said power cylinder to extend through an interior of said tubular ram, said piston means being capable of moving an extended end of said gripping member into and outwardly of said interior of said tubular ram;

said extended end of said gripping member being circumferentially divided into sections by axially extending slots therethrough, said sections of said extended end having internally threaded portions having a plurality of internal threads which match said plurality of said external threads of said threaded end of said shaft when said extended end is fully within said interior of said tubular ram, said sections being performed to be separated one from the other to allow said internally threaded portions to freely pass over said threaded end of said shaft when said extended end is outwardly of said interior of said tubular ram;

said tubular ram having an interior wall which makes sliding contact with an exterior surface of said extended end of said gripping member to cam said sections thereof inwardly to entrap said threaded end of said shaft in said internally threaded portions when said plurality of said external threads and said plurality of said internal threads are aligned and intermeshed and said extended end is moved into said interior of said tubular ram;

said end of said tubular ram being capable of acting on said surface of said element on said enlarged portion of said shaft as said extended end moves further into said interior of said tubular ram by said piston means; and said piston means being incapable of producing said camming of said sections inwardly to entrap said threaded end of said shaft in said internally threaded portion when said plurality of said external threads and said plurality of said internal threads are misaligned and unable to intermesh.

2. The tool as set forth in claim 1, wherein said exterior surface of said extended end is on radial projections of said sections.

3. The tool as set forth in claim 2, wherein said radial projections have an external diameter when said extended end is outwardly of said interior of said tubular ram which is greater than an internal diameter of said tubular ram as defined by said interior wall.

* * * * *